Patented Aug. 23, 1927.

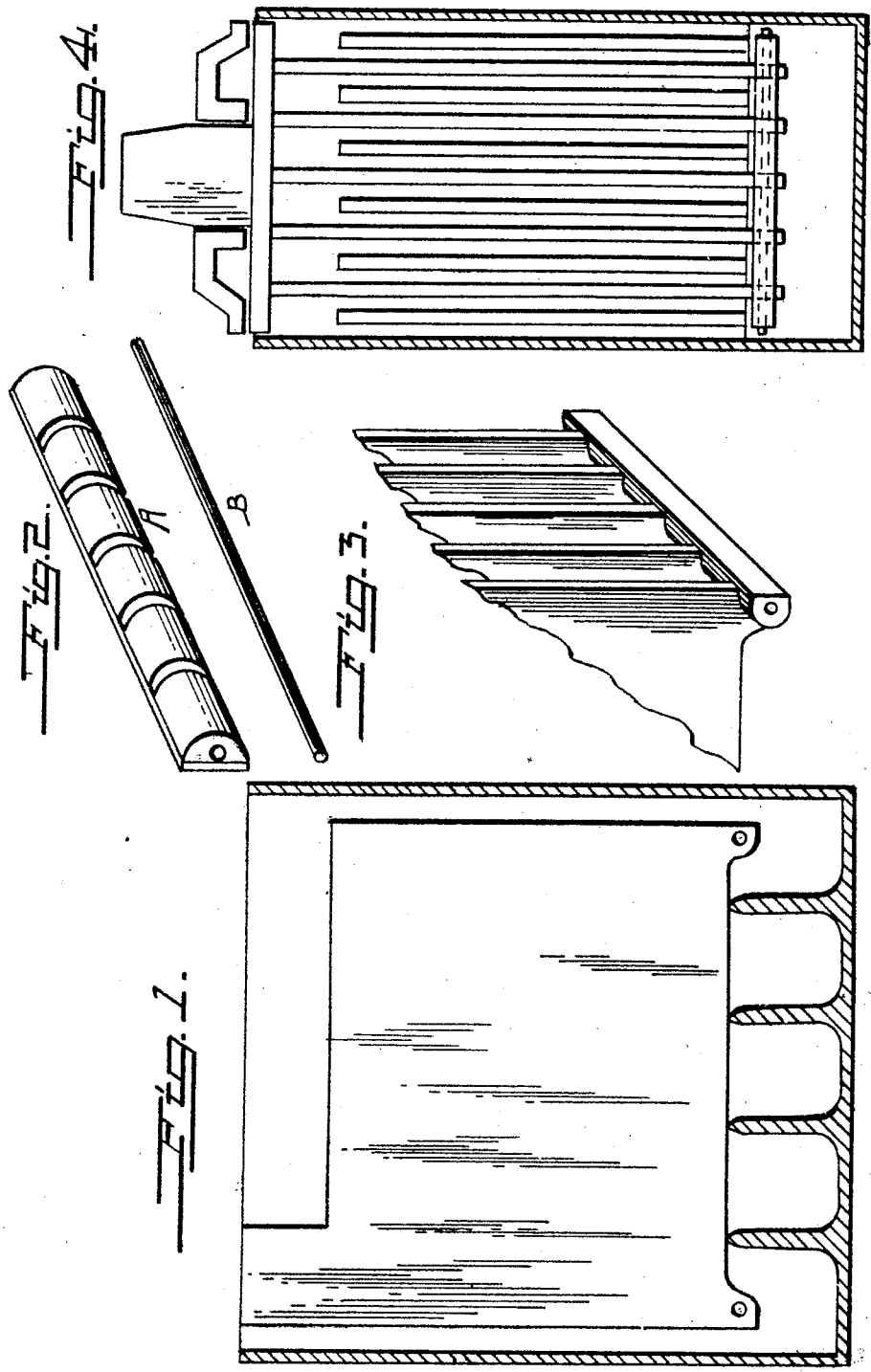

1,639,922

UNITED STATES PATENT OFFICE.

STANLEY ALBERT BREULS, OF SUTTON WEST, ONTARIO, CANADA.

STORAGE BATTERY.

Application filed August 14, 1923, Serial No. 657,364, and in Canada May 30, 1923.

My invention relates to an improvement in storage batteries by means of which the life of the battery is considerably lengthened by the use of novel features in the positive plates of the battery, used in conjunction with a locking device which consists of a toothed bar made either of non-conducting material or of metal, which locks the positive plates in place by means of a pin (made either of non-conducting material or of metal) through the said bar.

The objects of my improvements are, first; to provide a storage battery of long life, and to that end, secondly; to provide a means of preventing the plates from "buckling" pinching or rubbing the wooden insulators and so, short circuiting; thirdly; by attaining the above objects by such means as will not reduce the capacity of the battery by a lessening of the plate surface.

I attain these objects by the mechanism illustrated by the accompanying drawing.

Figure 1 is a view of one of the positive plates of the battery showing the lugs at the corners of the base thereof which have a small hole near the edge of the plate.

Part A, Figure 2, is a view of a half round circular bar made either of a non-conducting material or of metal, which has slots cut therein into which the positive plates fit and having a hole through the said bar.

Part B of said Figure 2 is a slightly wedge shaped pin made either of a non-conducting material or of metal.

Figure 3, is an angle view of the positive group only as it would appear when locked together by means of the locking device.

Figure 4, is a vertical section of an entire cell showing the manner in which the positive group is locked together at the base, and the relative position thereof to the negative plates.

Similar letters refer to similar parts throughout the several views.

In assembling the battery, my invention is applied as follows

The positive group is inserted in the negative group. The lugs on the positive plates which extend below the base of the negative plates are now inserted in the slots of the half round circular bar A, Figure 2, and the wedge shaped pin B, Figure 2, is now inserted through the holes in the bar and plates thus locking the positive plates firmly together at each corner of the base. The two groups are now inserted in the battery jar or container and the wooden separators placed between the plates. As the base of both groups rest on the bridges at the bottom of the jar or container, the locking device which is on the lugs at the corners of the positive plates only, does not touch the negative plates and at the same time the connection is made in such a place and manner that the capacity of the battery is not reduced by a lessening of the plate surface. The electrolyte is now poured in and the jar topped and sealed.

What I do claim as my invention and desire to secure by Letters Patent is—

In combination a series of battery plates in spaced relation and having apertures near their edges with the apertures in alinement, a metal locking bar extending across the plates and provided with transverse slots in which are seated the plates, said bar having a longitudinal opening registering with the alined apertures of the plates and a locking pin extending through the longitudinal openings of the locking bar and said apertures in the plates.

Dated at Sutton West, Ontario, this 4th day of August, 1923.

STANLEY ALBERT BREULS.